(12) United States Patent
Fisher et al.

(10) Patent No.: US 7,396,516 B2
(45) Date of Patent: Jul. 8, 2008

(54) MANGANESE CONTAINING OXYGEN STORAGE COMPONENT COMPRISING THREE-WAY CATALYST COMPOSITION

(75) Inventors: Janet Mary Fisher, Reading (GB); Timothy Ian Hyde, Reading (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 796 days.

(21) Appl. No.: 10/432,098

(22) PCT Filed: Nov. 20, 2001

(86) PCT No.: PCT/GB01/05124

§ 371 (c)(1),
(2), (4) Date: Feb. 17, 2004

(87) PCT Pub. No.: WO02/40151

PCT Pub. Date: May 23, 2002

(65) Prior Publication Data

US 2004/0132615 A1    Jul. 8, 2004

(30) Foreign Application Priority Data

Nov. 20, 2000   (GB) ................. 0028240.0

(51) Int. Cl.
- *B01D 53/46* (2006.01)
- *B01D 53/94* (2006.01)
- *B01J 23/34* (2006.01)
- *F01N 3/10* (2006.01)
- *F02B 67/00* (2006.01)

(52) U.S. Cl. .............. 423/213.2; 423/213.5; 423/239.1; 423/245.3; 423/247; 60/272; 60/282; 60/299; 123/1 R; 502/302; 502/304; 502/324; 502/325; 502/349; 502/439

(58) Field of Classification Search .................. 502/304, 502/349, 302, 325, 439; 423/213.2, 213.5, 423/239.1, 245.3, 247; 60/272, 282, 299; 123/1 R See application file for complete search history.

(56) References Cited

U.S. PATENT DOCUMENTS

| | | | |
|---|---|---|---|
| 3,842,015 A * | 10/1974 | Vogt et al. ................ | 502/241 |
| 3,894,967 A | 7/1975 | Koepernik et al. | |
| 3,899,444 A | 8/1975 | Stephens | |
| 3,923,690 A * | 12/1975 | Vogt et al. ................ | 502/184 |
| 3,948,808 A * | 4/1976 | Box, Jr. et al. ............ | 502/303 |
| 3,974,255 A * | 8/1976 | Erickson et al. .......... | 423/212 |
| 3,983,072 A | 9/1976 | Stephens | |
| 4,171,288 A | 10/1979 | Keith et al. | |
| 4,261,862 A | 4/1981 | Kinoshita et al. | |
| 4,871,709 A | 10/1989 | Tatsushima et al. | |
| 5,075,276 A | 12/1991 | Ozawa et al. | |
| 5,130,109 A | 7/1992 | Wan | |
| 5,182,249 A | 1/1993 | Wang et al. | |
| 5,286,700 A | 2/1994 | Terui et al. | |
| 5,340,562 A | 8/1994 | O'Young et al. | |
| 5,387,399 A * | 2/1995 | Nishida et al. ............. | 422/171 |
| 5,472,676 A | 12/1995 | Terui et al. | |
| 5,698,165 A | 12/1997 | Terada et al. | |
| 5,880,059 A * | 3/1999 | Tsyrulnikov et al. ........ | 502/324 |
| 6,214,303 B1 | 4/2001 | Hoke et al. | |

FOREIGN PATENT DOCUMENTS

| | | |
|---|---|---|
| DE | 40 07 965 A1 | 9/1991 |
| DE | 42 14 282 A1 | 11/1993 |
| EP | 0 361 385 A2 | 4/1990 |
| EP | 0 367 574 A2 | 5/1990 |
| EP | 0 371 740 A1 | 6/1990 |
| EP | 0 387 044 A1 | 9/1990 |
| EP | 3-293018 | 12/1991 |
| EP | 0 479 159 A1 | 4/1992 |
| EP | 0 545 404 A1 | 6/1993 |
| EP | 1048341 A1 | 11/2000 |
| EP | 0 980 707 A1 | 2/2003 |
| GB | 2048101 A | 12/1980 |
| JP | 51-71299 | 6/1976 |
| JP | 4-7038 | 1/1992 |
| WO | WO-96/22146 | 7/1996 |
| WO | WO-96/22148 | 7/1996 |
| WO | WO 99/34904 A1 * | 7/1999 |
| WO | WO-02/092197 A1 | 11/2002 |

OTHER PUBLICATIONS

Abstract of Japanese Patent No. 4358538, published Dec. 11, 1992.
Abstract of Japanese Patent No. 63116742, published May 21, 1988.
International Search Report, from International Application No. PCT/GB01/05124, dated Feb. 6, 2002.

(Continued)

*Primary Examiner*—Timothy C Vanoy
(74) *Attorney, Agent, or Firm*—RatnerPrestia

(57) ABSTRACT

A three-way catalyst (TWC) composition comprises a manganese-containing oxygen storage component (OSC) and at least one optionally doped alumina wherein where the at least one alumina is gamma-alumina it is doped with at least one of a rare earth metal, silicon, germanium, phosphorus, arsenic, calcium, strontium or barium.

20 Claims, 2 Drawing Sheets

OTHER PUBLICATIONS

Figure 1:
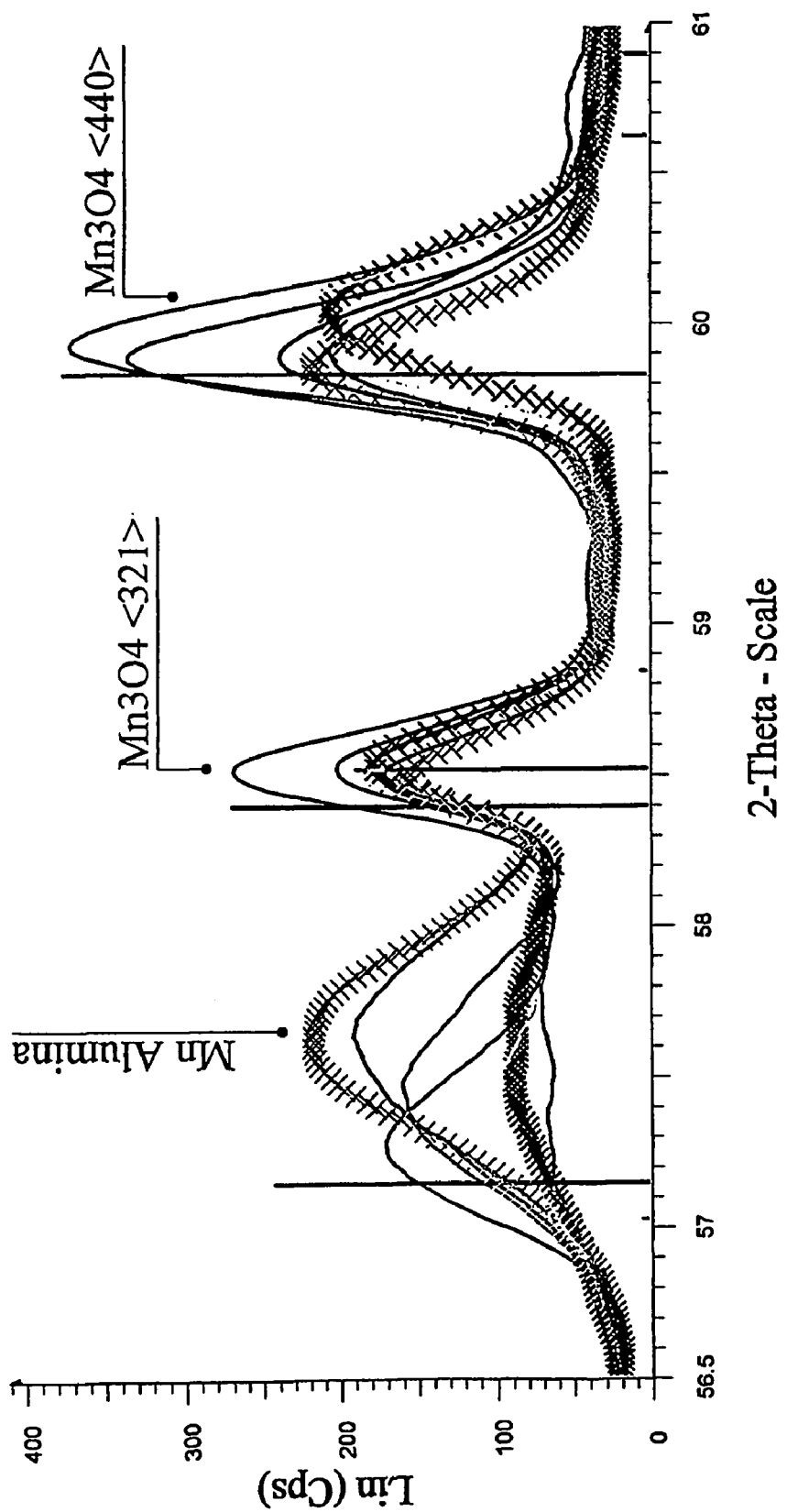

British Search Report, from British Application No. 0028240.2, dated Apr. 3, 2001.

Encyclopaedia of Chemical Technology, First Edition, vol. 9, pp. 736-737, Ed. R. E. Kirk and D. F. Othmer, *The Interscience Encyclopaedia, Inc.*, New York, 1952.

Alexander J. Fatiadi, "The Oxidation of Organic Compounds by Active Manganese Dioxide," *Organc Synthesis by Oxidation with Metal Compounds*, Ed. W. J. Mijs and C. R. H. DeJonge (New York: Plenum Press, 1986), pp. 119-127 and 241-260.

O. Mancera et al., "452. Steroids. Part XLVI. Synthesis of 11β-Hydroxytestosterone and 11-Ketotestosterone," *Amer. Chem. Soc.*, pp. 2189-2191.

Attenburrow et al., "194. A Synthesis of Vitamin A from cycloHexanone," *J. Amer. Chem. Soc.*, 1952, pp. 1094-1111.

R. M. McKenzie, "The synthesis of birnessite, cryptomelane, and some other oxides and hydroxides of manganese," *Mineralogical Magazine*, Dec. 1971, vol. 38, pp. 493-502.

* cited by examiner

MANGANESE CONTAINING OXYGEN STORAGE COMPONENT COMPRISING THREE-WAY CATALYST COMPOSITION

This application is the U.S. national phase application of PCT International Application No. PCT/GB01/05124.

The present invention concerns an improved three-way catalyst (TWC) composition, and in particular a TWC composition which retains oxygen storage capacity more effectively following high-temperature ageing.

The use of catalysts in automobile exhaust systems has contributed to a significant improvement in air quality. The most commonly used catalyst in exhaust systems of particularly gasoline engines is the "three-way catalyst" (TWC) which has three main duties, namely the oxidation of CO and unburnt hydrocarbons (HC's) to $CO_2$ and $CO_2$ and $H_2O$ respectively by NOx and $O_2$ present in the exhaust gas, which NOx is consequently reduced to $N_2$. Such catalysts require careful engine management techniques to ensure that the engine operates at or close to stoichiometric conditions (air/fuel ratio, $\lambda=1$). For technical reasons, however, it is necessary for engines to operate on either side of $\lambda=1$ at various stages during an operating cycle. When the engine is running rich, for example during acceleration, the overall exhaust gas composition is reducing in nature, and it is more difficult to carry out oxidation reactions on the catalyst surface. For this reason, TWCs have been developed to incorporate a component which stores oxygen during leaner periods of the operating cycle, and releases oxygen during richer periods of the operating cycle, thus extending the effective operating envelope. This component is believed to be ceria-based in the vast majority of current commercial TWC's.

Generally, a TWC composition comprises three parts: alumina; an oxygen storage component (OSC), such as a ceria-zirconia mixed oxide; and platinum group metals (PGM) supported on one or both of the alumina and OSC. The alumina component is to provide a rapid light-off of the composition. Light-off is the temperature at which the catalyst is working at 50% or above efficiency for a given reaction. The achievement of rapid light-off is therefore important to treat exhaust gases immediately after cold start The property of the OSC is explained above. Typically there are at least two PGMs present, one of platinum and palladium as an oxidation catalyst and rhodium as a reduction catalyst.

The alumina and OSC are usually intimately mixed and applied to a substrate, such as a ceramic honeycomb, in a washcoat. The PGMs can be impregnated on one or both of the alumina and OSC and either before making up the washcoat, or by adding it to the washcoat Impregnation of the PGM before making up the washcoat enables the formulator to choose which component is to support a PGM. For example, the rhodium can be supported solely by the OSC and the platinum solely by the alumina. An alternative arrangement is to have the components and/or PGMs in separate layers one above the other. It has even been suggested that certain ceria-based TWC components are active enough catalytically that reduced amounts of PGM are required or none at all.

Ceria, however, especially when doped with precious metal catalysts such as Pd, shows a great tendency to lose surface area when exposed to high temperatures, e.g. 800° C. or above, and the overall performance of the catalyst is degraded. Because of this, TWC's are being proposed and introduced in some demanding markets which use, instead of ceria as the OSC, ceria-zirconia mixed oxides, which are very much more stable to loss of surface area than ceria alone. Ceria-zirconia, however, is a relatively expensive material when available commercially, and it would be desirable to find a material having similar oxygen storage performance as ceria-zirconia, but utilising less expensive materials.

In our British patent application no. 9800325.4, we described TWC OSC's including certain mixed oxides selected from iron/zirconium, iron/titanium, iron/aluminium, manganese/zirconium, manganese/titanium, manganese/aluminium and cerium/titanium. Ternary or quaternary mixed oxides comprising iron, and/or manganese and zirconium and/or titanium and/or aluminium and the single oxide manganese dioxide were also described. We also mentioned that these mixed oxides could be doped to provide further stability or enhanced performance. The doping agents mentioned were the oxides of rare earths such as neodymium and lanthanum, as well as yttrium, niobium, zirconium titanium and vanadium.

The oxygen storage capacity of these components was generally very good. It was found that when the manganese-containing OSC's were made up into TWC compositions, and aged as part of an exhaust system using an accelerated engine ageing cycle designed to mimic the thermal and exhaust gas composition typical of an underfloor catalyst position, some distance from the engine manifold, then the subsequent exhaust emissions were found to be equivalent to a TWC catalyst containing a state-of-the-art ceria-zirconia mixed oxide OSC. However, when similar manganese-containing OSC's TWC compositions were subjected to an accelerated engine ageing cycle, typical of a close-coupled position, much higher exhaust emissions were found than the ceria-zirconia containing TWC composition. The temperatures involved in this latter type of testing may reach 1100° C., as they are designed to simulate continued exposure to the temperature of the exhaust gases close to the engine exhaust manifold. Many developers of emission control systems use accelerated engine and thermal ageing as a means to deactivate the catalyst activity to determine the effectiveness of the catalyst to achieve legislated emissions standards at end-of-life. These tests often subject catalyst compositions to temperatures in excess of those experienced by the catalyst under normal operation. It is generally perceived that thermal effects, coupled with effects due to the changing exhaust gas composition have the greatest deactivation effect on the ability of catalyst to convert exhaust emissions effectively.

We investigated what was causing loss of emissions control with our close-coupled aged TWC compositions comprising manganese-containing OSC's, and found a loss in oxygen storage capacity. Further investigation found that an important factor was the formation of manganese aluminate, i.e. a true mixed oxide formed between the manganese component of the OSC's and the alumina part of the washcoat. We then deliberately prepared a series of manganese-aluminium compositions and thermally treated them in such a way as to induce mixed oxide, i.e. manganese aluminate, formation. These materials were then evaluated for oxygen storage capacity and found to have far inferior properties to manganese-containing OSC's wherein the manganese is not present as a mixed oxide. This showed that manganese present as a free oxide gives superior oxygen storage properties than if present as a mixed oxide phase.

Subsequently, we have found a group of doped-aluminas which are more resistant to formation of manganese aluminate during high temperature ageing than TWC compositions containing non-doped alumina.

According to one aspect, the invention provides a three-way catalyst (TWC) composition comprising a manganese-containing oxygen storage component (OSC) and at least one optionally doped alumina wherein where the at least one alumina is gamma-alumina it is doped with at least one of a rare earth metal, silicon, germanium, phosphorus, arsenic, calcium, strontium or barium.

Apart from gamma-alumina the at least one alumina can be delta-, theta- or alpha-alumina.

The delta-, theta- and alpha-alumina can be doped with at least one of a rare earth metal, silicon, germanium, phosphorus, arsenic, calcium, strontium or barium.

In an illustrative embodiment, the at least one rare earth metal dopant can be lanthanum, yttrium, cerium, praseodymium, neodymium, promethium, samarium, europium, gadolinium, terbium, dysprosium, holmium, erbium, thulium, ytterbium and lutetium or a mixture of any two or more thereof. In a further illustrative embodiment, the rare-earth metal gamma-alumina dopant is lanthanum.

The phase nature of the doped alumina mixed oxide is not believed to be important to the performance of the present invention. For example the dopant can be present as a cation in a matrix of a true mixed oxide or a non-single phase mixed oxide.

The or each alumina dopant can be present in a total amount of from 0.5 to 20 wt. % of oxide based on alumina content.

In an illustrative embodiment, the manganese-containing OSC can comprise zirconia, which can be doped with at least one rare earth metal, such as any of those mentioned above.

Where present, the or each zirconia-dopant is present in an amount of from 3 to 30 wt. % of oxide based on zirconia content.

The manganese-containing OSC can comprise manganese supported on a manganese aluminate ($Mn_2AlO_4$), scandium aluminate, titanium aluminate, vanadium aluminate, chromium aluminate, iron aluminate, cobalt aluminate, nickel aluminate, copper aluminate, or zinc aluminate support or an aluminate support containing two or more of these first row transition elements.

The weight ratio of the alumina component to the OSC in the TWC composition according to the invention is not critical and can be based on formulations current in the art.

We have found that the manganese components of the OSC of the present invention are present in higher oxidation states than are typical amongst the commonly known oxide structures containing Mn, such as $Mn_2O_3$, bixbyite and $Mn_3O_4$, hausmannite. Thus in an illustrative embodiment at least some of the Mn be present in an oxidation state above 2+, and in a further illustrative embodiment, be present as a single binary oxide phase, and not present in an oxide structure with other metal cations. Where necessary, this can be achieved by resorting to oxide mole ratios and preparation techniques that avoid these mixed oxide phases. In some cases, it is desirable to arrange the component oxides so that they do not form a true single phase, but remain an intimate mixture of oxide phases.

The OSC may be used in any catalyst design, including single layer and layered catalysts and distributed particle catalysts, using conventional catalyst preparative methods.

According to a further aspect of the present invention, there is provided a ceramic or metal substrate comprising a TWC composition according to the invention. In another aspect, the present invention provides a can or shell comprising the substrate.

According to a further aspect, the present invention provides an exhaust system for an internal combustion engine, such as a gasoline engine, including a TWC composition according to the invention. In a related aspect, the invention also provides an internal combustion engine, such as a gasoline engine, including the exhaust system.

The gasoline engine can be a lean-burn gasoline engine, such as a direct injection gasoline engine. Where the exhaust system is for a lean burn gasoline engine, the exhaust system can also include one or more additional TWC (according to the invention or otherwise) and/or further catalyst components such as a NOx trap (lean NOx catalyst).

According to a further aspect, the invention provides the use of a TWC composition according to the invention for catalysing the reduction of nitrogen oxides, the oxidation of hydrocarbons and/or the oxidation of carbon monoxide in automobile exhaust gas.

Suitable OSC for use in the present invention may be prepared by conventional means, such as co-precipitation. For example, solutions of soluble salts of the metals may be mixed in the appropriate concentrations and amounts to yield the desired end product, then caused to precipitate concurrently, for example by adding a base such as ammonium hydroxide. Alternatively, other preparative routes utilising generally known technology, such as sol/gel or gel precipitation, have been found suitable. The precipitated oxides as slurries may be filtered, washed to remove residual ions, dried, then fired or calcined at elevated temperatures (>450° C.) in air.

To assess the TWC compositions according to the present invention for oxygen storage capacity, low levels of precious metal (<4.5 wt. %), such as platinum, palladium or rhodium are added to the mixed oxide by conventional means, e.g. incipient wetness impregnation. This ensures a good dispersion of the precious metal on the support. It is well known that to achieve good oxygen storage capacity a good interaction of the precious metal with the support is necessary. The precious metal impregnated mixed oxides are generally further thermally treated prior to activity testing. This can include a calcination in air at elevated temperatures (>500° C.) together with a treatment designed to simulate the changing exhaust gas mixture typically found by catalysts in vehicle exhaust systems. It has been found that subjecting the precious metal impregnated OSC to a hydrothermal ageing at 850° C. in a gas mixture where the gas component stoichiometry is cycled between net reducing and net oxidising, is a convenient means of pre-treatment, to distinguish between good and bad materials.

The TWC compositions of the present invention have been tested for their ability to store and release oxygen according to a test developed in-house. After impregnating the sample oxide with a solution of a Pd salt, for example Pd nitrate, in sufficient quantity to deposit 2% by weight Pd on the oxide, the samples are then calcined at 500° C. in air to fix the Pd onto the oxide, and then further aged at 850° C. under hydrothermal conditions to mimic catalyst ageing, and samples are then charged into a micro-reactor. The samples are oxidised by passing a diluted oxygen in helium gas mix over the samples at the chosen temperature, e.g. 500° C., then the oxygen flow is terminated and diluted carbon monoxide (CO) in helium gas mix is passed over the sample. The time required to detect CO breakthrough is measured and is used to give a reproducible assessment of oxygen storage capacity. Oxygen storage capacity is generally quoted in units of micromole of oxygen per gram of sample ("$\mu mol\ (O)g^{-1}$").

Another tool for assisting in identifying whether a single-phase oxide of manganese will react with an alumina to give manganese aluminate is X-ray diffraction crystallography (XRD). XRD is particularly good for distinguishing between manganese that is present as a single oxide phase, such as $Mn_3O_4$, and manganese that is present as part of a manganese aluminate composition.

Figure 2:
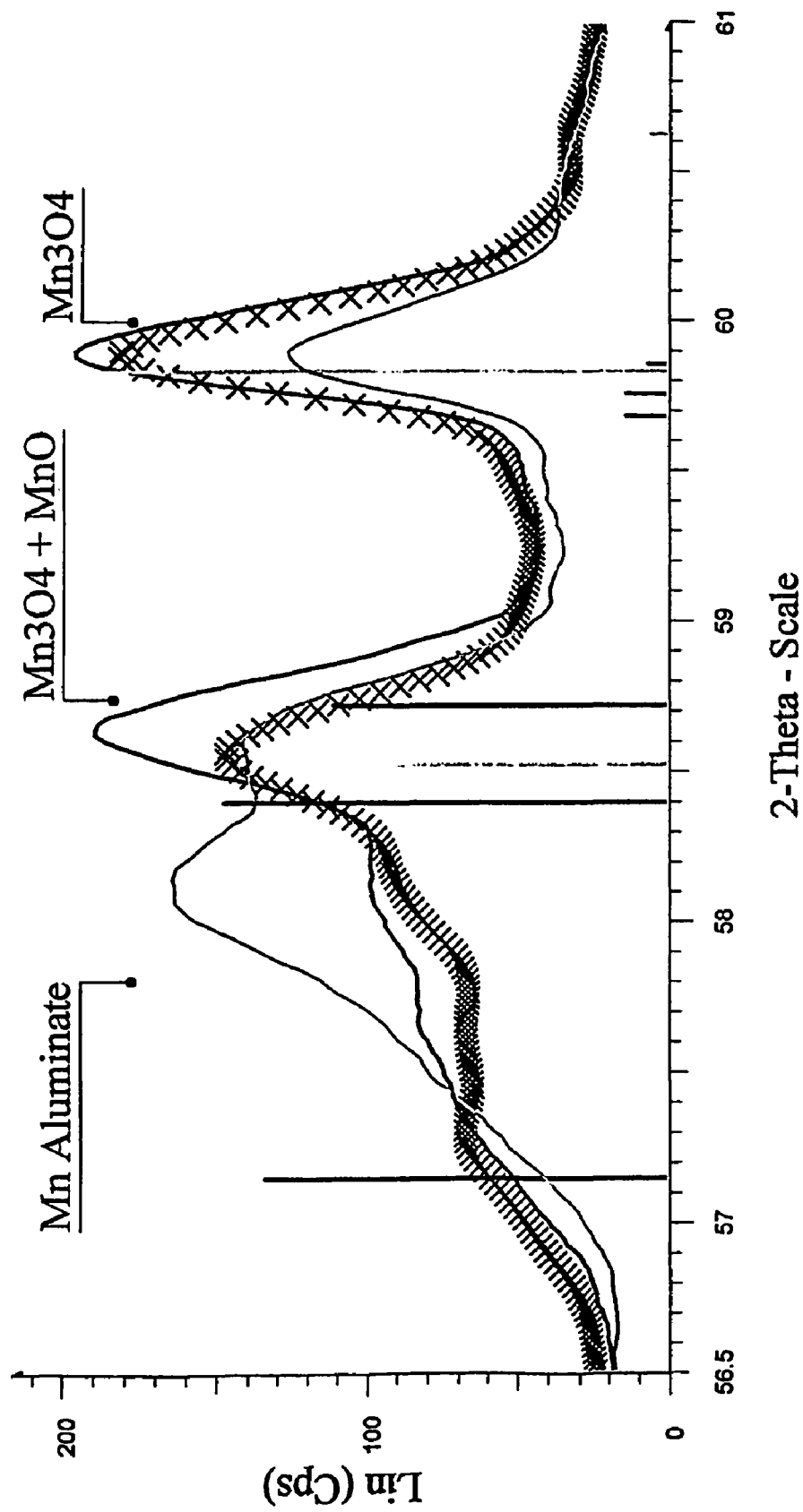

In order that the invention may be more fully understood, the following Examples are provided by way of illustration only and with reference to the accompanying drawings, in which:

FIG. 1 shows a portion of the XRD patterns of a number of manganese-alumina powders; and FIG. 2 shows a portion of the XRD patterns of a further three manganese-alumina powders.

EXAMPLE 1

To determine the readiness of an alumina to interact with manganese after a high temperature ageing, a series of samples were prepared where manganese was deliberately interacted with a number of aluminas in such a manner as to ensure maximum manganese aluminate formation.

A series of manganese-alumina samples were prepared by incipient wetness impregnation of aqueous manganese (II) nitrate solutions onto various alumina powders including those of the present invention, to give samples of a mole ratio of 1:2 Mn:Al. These samples were subsequently dried and calcined in air at 250° C. and then calcined in 900° C. in $N_2$. This latter treatment has been found to induce manganese aluminate formation in manganese-alumina co-precipitated products. These samples were then investigated by XRD. FIG. 1 shows a portion of the XRD patterns of a number of manganese-alumina powders. Three main peaks are shown. The peaks at 58.5 and 60.2-theta shows free $Mn_3O_4$ in the material, while the peaks between 57 and 58.2-theta show the presence of manganese aluminate ($MnAl_2O_4$). The areas of the peaks have been determined for the samples and the ratio calculated. The ratio of the peak areas gives a guide to the ability of the different aluminas to form Mn aluminate. A high value represents a large proportion of manganese aluminate and a low value represents a low proportion of manganese aluminate.

The results are shown in Table 1. Gamma-alumina and gamma-alumina 1 refer to gamma aluminas obtained from different suppliers.

TABLE 1

Mn aluminate to $Mn_3O_4$ XRD peak area ratio of manganese alumina samples

| Alumina Type | Mn aluminate:$Mn_3O_4$ Peak Area Ratio |
|---|---|
| Gamma-alumina | 2.1 |
| Pseudo-boemite calcined to 500° C. | 1.5 |
| 10 wt % Ba doped gamma-alumina | 1.2 |
| Theta-alumina | 1.0 |
| 2.6 wt. % La doped gamma alumina | 0.7 |
| 3.1 wt. % La doped gamma alumina | 0.9 |
| 3.4 wt. % La doped gamma alumina 1 | 0.1 |

As can be seen, the doped aluminas, together with the theta-alumina show greater resistance towards the formation of manganese aluminate formation, than either the gamma-alumina or the pseudo-boemite, which becomes gamma-alumina after the pre calcination.

EXAMPLE 2

Adopting the methods of preparation set out in Example 1, three further samples were prepared by impregnating aqueous manganese (II) nitrate onto alumina powder (gamma-alumina, and two 3.4 wt. % La doped gamma-aluminas) to give a Mn:Al ratio of 1:2. These samples were dried and calcined at 250° C., palladium was then deposited to give a 2 wt. % loading, by incipient wetness impregnation of aqueous palladium (II) nitrate solution. The resulting samples were calcined at 250° C. in air. The Pd doped samples, were then aged using an in-house protocol. Samples were subjected to a hydrothermal rich/lean ageing in the presence of $SO_2$, at a temperature of 850° C.

The resulting aged samples were characterised by XRD as explained in Example 1. The relevant portions of the XRD patterns are shown in FIG. 2. As before the peaks due to free $Mn_3O_4$ appear at 58.5 and 60.2-theta, but the peak due to Mn aluminate now appears between 57.5 and 58.2-theta, indicating that after the hydrothermal lean/rich ageing, that a slightly different stoichiometry of Mn aluminate is formed. Comparison of the three samples, illustrates that the un-doped gamma-alumina containing sample shows the highest proportion of Mn aluminate, while the two La-doped gamma-alumina containing samples show the highest amount of free $Mn_3O_4$.

The three aged samples were also evaluated for oxygen storage capacity using the in-house test described above. The samples were also compared to a similarly treated 2 wt. % palladium doped manganese-ceria stabilised zirconia of molar ratio composition 46:8:46 OSC as described in British patent application no. 9800325.4. The results are shown in Table 2, the oxygen storage capacities expressed as micromoles of oxygen per gram of manganese present.

TABLE 2

Oxygen storage capacities of hydrothermally aged Mn—$Al_2O_3$ mixtures (Mn:Al mole ratio 1:2)

| Alumina type | Oxygen storage capacity/μmol (O) $g^{-1}$ (Mn) |
|---|---|
| Gamma-alumina | 3878 |
| 3.4 wt % La doped gamma-alumina 1 | 4552 |
| 3.4 wt % La doped gamma-alumina 2 | 4175 |
| Mn—CeZr (46:8:46 mole ratio) oxide | 6117 |

It is clear from the results in Table 2, that the two La doped alumina containing samples show higher oxygen storage capacity values than that containing the un-doped alumina. This indicates that the La doped samples contain less Mn aluminate, as suggested by XRD. Comparison with the Mn—CeZr oxide mixture sample, where only free manganese oxide is found by XRD, showed that even the MnAl sample containing 3.4% La doped gamma alumina 1 does contain some Mn aluminate, again as suggested by XRD.

The invention claimed is:

1. A three-way catalyst (TWC) composition comprising an oxygen storage component (OSC), at least one platinum group metal and at least one alumina, wherein in the event that the at least one alumina comprises gamma-alumina, the gamma-alumina is doped with at least one of a rare earth metal, silicon, germanium, phosphorus, arsenic, calcium, strontium or barium, and wherein the OSC comprises manganese supported on a support selected from the group consisting of a manganese aluminate ($Mn_2AlO_4$) support, a scandium aluminate support, a titanium aluminate support, a vanadium aluminate support, a chromium aluminate support, an iron aluminate support, a cobalt aluminate support, a nickel aluminate, a copper aluminate support, a zinc aluminate support and an aluminate support containing two or more first row transition elements.

2. A TWC composition according to claim 1, wherein the alumina is selected from the group consisting of delta-alumina, theta-alumina, and alpha-alumina.

3. A TWC composition according to claim 2, wherein the alumina is doped with at least one of a rare earth metal, silicon, germanium, phosphorus, arsenic, calcium, strontium or barium.

4. A TWC composition according to claim 1, wherein the alumina is doped with at least one of a rare earth metal, silicon, germanium, phosphorous, arsenic, calcium, strontium or barium and the at least one alumina dopant is present in a total amount of from 0.5 to 20 wt. % based on alumina content.

5. A TWC composition according to claim 1, wherein the OSC further comprises zirconia.

6. A TWC composition according to claim 5, wherein the zirconia is doped with at least one rare earth metal.

7. A TWC composition according to claim 6, wherein the at least one rare earth metal is present in a total amount of from 3 to 30 wt. % based on zirconia content.

8. A TWC composition according to claim 1, wherein the alumina is doped with at least one rare earth metal and the at least one rare earth metal dopant is selected from the group consisting of lanthanum, yttrium, cerium, praseodymium, neodymium, promethium, samarium, europium, gadolinium, terbium, dysprosium, holmium, erbium, thulium, ytterbium and lutetium or a mixture of any two or more thereof.

9. A TWC composition according to claim 8, wherein the at least one rare earth metal dopant is lanthanum.

10. A TWC composition according to claim 1, wherein at least some of the manganese supported on the support is present in an oxidation state higher than +2.

11. A TWC composition according to claim 10, wherein the at least some of the manganese is present as a single binary oxide phase.

12. A TWC composition according to claim 1, wherein the at least one PGM is platinum, palladium or rhodium or mixtures of any two or all thereof.

13. A TWC composition according to claim 1, wherein the alumina consists of gamma-alumina and the gamma alumina is doped with at least one of a rare earth metal, silicon, germanium, phosphorus, arsenic, calcium, strontium or barium.

14. A ceramic or metal substrate comprising a TWC composition according to claim 1.

15. A can or shell comprising a substrate according to claim 14.

16. An exhaust system for an internal combustion engine including a TWC composition according to claim 1.

17. An internal combustion engine including an exhaust system according to claim 16.

18. A gasoline engine according to claim 17.

19. A lean-burn gasoline engine according to claim 18.

20. A method of catalysing the reduction of nitrogen oxides, the oxidation of hydrocarbons and/or the oxidation of carbon monoxide in automobile exhaust gas, which method comprising contacting the exhaust gas with a three-way catalyst composition according to claim 1.

* * * * *

UNITED STATES PATENT AND TRADEMARK OFFICE
CERTIFICATE OF CORRECTION

PATENT NO. : 7,396,516 B2 Page 1 of 1
APPLICATION NO. : 10/432098
DATED : July 8, 2008
INVENTOR(S) : Janet Mary Fisher et al.

It is certified that error appears in the above-identified patent and that said Letters Patent is hereby corrected as shown below:

On the cover page, at "(56) References Cited," under "FOREIGN PATENT DOCUMENTS":

Line 7, "EP 3-293018   12/1991" should be --JP 3-293018   12/1991--.

and

Line 11, "EP 0 980 707 A1   2/2003" should be --EP 0 980 707 A1   2/2000--.

Signed and Sealed this

Twenty-third Day of December, 2008

JON W. DUDAS
*Director of the United States Patent and Trademark Office*